United States Patent
Yamamura et al.

(10) Patent No.: US 9,295,918 B2
(45) Date of Patent: Mar. 29, 2016

(54) GAME CONTROL SERVER APPARATUS PROVIDING STRONG ENEMY CHARACTER IN GAME

(71) Applicant: DeNA Co., Ltd., Tokyo (JP)

(72) Inventors: Akira Yamamura, Tokyo (JP); Toshiko Enomoto, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/564,332

(22) Filed: Dec. 9, 2014

(65) Prior Publication Data

US 2015/0165325 A1 Jun. 18, 2015

(30) Foreign Application Priority Data

Dec. 16, 2013 (JP) ................................. 2013-259226

(51) Int. Cl.
```
A63F 13/40    (2014.01)
A63F 13/58    (2014.01)
A63F 13/35    (2014.01)
A63F 13/355   (2014.01)
A63F 13/46    (2014.01)
A63F 13/847   (2014.01)
A63F 13/47    (2014.01)
A63F 13/49    (2014.01)
A63F 13/822   (2014.01)
A63F 13/44    (2014.01)
```

(52) U.S. Cl.
CPC ................. *A63F 13/58* (2014.09); *A63F 13/35* (2014.09); *A63F 13/355* (2014.09); *A63F 13/46* (2014.09); *A63F 13/47* (2014.09); *A63F 13/49* (2014.09); *A63F 13/822* (2014.09); *A63F 13/847* (2014.09); *A63F 13/44* (2014.09)

(58) Field of Classification Search
CPC .............. A63F 13/12; A63F 2300/807; A63F 2001/008; A63F 13/10; A63F 2300/407; A63F 2300/5533; A63F 2300/634; A63F 13/00; A63F 13/58; A63F 13/30; A63F 13/44; A63F 13/822; A63F 13/847
See application file for complete search history.

(56) References Cited

U.S. PATENT DOCUMENTS

2013/0324256 A1   12/2013  Takagi et al.
2014/0302923 A1*  10/2014  Sato et al. ........................ 463/31

FOREIGN PATENT DOCUMENTS

JP             5291823           9/2013

OTHER PUBLICATIONS

MAA Wiki, Marvel: Avengers Alliance, latest Oct. 30, 2013, <http://avengersalliance.wikia.com/wiki/Group_Boss?oldid=431612, <http://avengersalliance.wikia.com/wiki/Marvel:_Avengers_Alliance?oldid=426874>, <http://avengersalliance.wikia.com/wiki/Special_Operations_-_Vision_of_the_Future/Tasks?oldid=241052>.*
Japanese Office Action mailed Mar. 25, 2014.

(Continued)

*Primary Examiner* — Justin Myhr
(74) *Attorney, Agent, or Firm* — IPUSA, PLLC (57) ABSTRACT

A game control server apparatus includes an enemy character providing unit that provides a normal enemy character and a strong enemy character in a game; and a game management control unit that repeats for a first period, a normal step of providing the normal enemy character to appear in the game, a determining step of determining whether an appearance condition of the strong enemy character is satisfied, and a strong step of providing the strong enemy character when the appearance condition is satisfied.

6 Claims, 9 Drawing Sheets

(56) References Cited

OTHER PUBLICATIONS

Finalfantasy VI the complete, NTT Publishing Co., Ltd., Sep. 19, 1994, first edition, P.142, see an item of "falcon-deck", with English concise explanation.

Sword Art Online end world, Dengeki game app., Ascii Media works, Aug. 18, 2012, vol. 5, P.6-10, with English concise explanation.

Strong enemy red dragon appears! "red dragon and divine magic stone" in session!, [online], Jun. 18, 2013, Final Fantasy Brigade official blog, [searched Feb. 18, 2014], the Internet <URL:http://blog.jp.square-enix.com/ff_b/m/2013/061post-9.php>, with English concise explanation.

Neko Reset (with one another), Shining hearts earliest guidebook, Kadokawa Corporation Enterbrain Brand Company, Dec. 28, 2010, first edition, P.033, see an item of "red encounter", with English concise explanation.

Takashi Kamiosako (with three others), Ryugagotoku 4 the one who succeeds legend complete conquering book, Kadokawa Corporation Enterbrain Brand Company, May 27, 2010, first edition, P.164, with English concise explanation.

Dragon quest battle road mobile, Weekly Famitu, Kadokawa Corporation Enterbrain Brand Company, Jul. 10, 2009, 24th(29), P.105, with English concise explanation.

Darksummoner, Appli-Fan, Cosmic corporation, Mar. 1, 2013, vol. 7, P.34-39, in particular, see an item of "Aim weekly ranking" at P.37 right below, with English concise explanation.

* cited by examiner

| PLAYER ID | STATUS | ICON DATA | PLAYER NAME | TEAM ID | POWER | OBTAINED POINT |
|---|---|---|---|---|---|---|
| p001 | 16 | image_p001 | AAA | T010 | 16 | 1200 |
| p002 | 10 | image_p002 | BBB | T010 | 10 | 1800 |
| : | : | : | : | : | : | : |
| p100 | 20 | image_p100 | CCC | T011 | 20 | 2000 |
| : | : | : | : | : | : | : |

| CHARACTER ID | ICON DATA | NAME | TYPE | NECESSARY DAMAGE TO DEFEAT | OBTAINABLE POINT |
|---|---|---|---|---|---|
| PBS001 | image_PBS001 | A | Strong | 5000 | 10000 |
| PBS002 | image_PBS002 | B | Strong | 6000 | 12000 |
| .. | .. | .. | | .. | .. |
| NBS001 | image_NBS001 | c | Normal | 100 | 100 |
| NBS002 | image_NBS002 | d | Norma | 100 | 100 |
| .. | .. | .. | | .. | .. |

| TEAM ID | BELONGING PLAYER | ACCUMULATED TOTAL OBTAINED POINT | TODAY'S OBTAINED POINT | OPPOSING TEAM ID | STRONG BOSS | | |
|---|---|---|---|---|---|---|---|
| | | | | | ID | ACCUMULATED DAMAGE | DEFEATED |
| T010 | p001, p002,⋯ | 98000 | 480 | T011 | PBS001 | 1320/5000 | 0 |
| T011 | p100,⋯ | 102000 | 10500 | T010 | PBS002 | 980/6000 | 1 |
| ⋯ | ⋯ | ⋯ | ⋯ | ⋯ | ⋯ | ⋯ | ⋯ |

GAME CONTROL SERVER APPARATUS PROVIDING STRONG ENEMY CHARACTER IN GAME

CROSS-REFERENCE TO RELATED APPLICATION

The present application is based on and claims the benefit of priority of Japanese Priority Application No. 2013-259226 filed on Dec. 16, 2013, the entire contents of which are hereby incorporated by reference.

BACKGROUND OF THE INVENTION

1. Field of the Invention

The present invention relates to a game control server apparatus.

2. Description of the Related Art

Conventionally, a game control server apparatus is known that provides a game in which players do not fight against each other, but the players compete with each other by points obtained in the game (Patent Document 1, for example).

Among such games, there is a game in which each player of a team attacks enemy characters that sequentially appear in the game, points are given to the team every time the enemy character is defeated, and the team compete with another team by the obtained points. Here, in accordance with the strength of the enemy character, when a strong enemy character is defeated, the team may obtain a very high point or a reward. Thus, the players go to great lengths to defeat a strong enemy character in order to obtain the very high point or the reward.

However, conventionally, there is a problem that the game lacks continuity. For example, once the player defeats a strong enemy character and obtains a very high point or a reward, motivation of the player to continue the game to defeat a subsequent enemy character is lowered.

PATENT DOCUMENT

[Patent Document 1] Japanese Patent No. 5,291,823

SUMMARY OF THE INVENTION

The present invention is made in light of the above problems, and provides a technique capable of increasing continuity of a game in which enemy characters sequentially appear and having a player continue the game.

According to an embodiment, there is provided a game control server apparatus connected to a plurality of terminal devices of a plurality of players via a network, the game control server apparatus including an enemy character providing unit that provides a normal enemy character and a strong enemy character in a game, the game being configured that each of a plurality of players of a same team attacks an enemy character, and points are given to the team for defeating the enemy character when the total of damages applied to the enemy character by the plurality of players becomes a necessary damage to defeat the enemy character, the necessary damage to defeat the strong enemy character being larger than the necessary damage to defeat the normal enemy character and the points given to the team when the strong enemy character is defeated being greater than the points given to the team when the normal enemy character is defeated; and a game management control unit that repeats for a first period, a normal step of providing the normal enemy character to appear in the game, a determining step of determining whether an appearance condition of the strong enemy character is satisfied, and a strong step of providing the strong enemy character when the appearance condition is satisfied; wherein in each of the strong steps, the game management control unit is capable of accepting predetermined upper limit number of times of attacking from each of the plurality of players, the predetermined upper limit number of times being set as a number by which it is difficult to defeat the strong enemy character by a single strong step even when each of all of the plurality of players attack the strong enemy character for the predetermined upper limit number of times, and finishes the strong step when a predetermined finishing condition is satisfied or when the strong enemy character is defeated, the predetermined finishing condition being that accepting the predetermined upper limit number of times of attacking from each of all of the plurality of players or a predetermined period passes after the strong enemy character appears, and the enemy character providing unit carries over the damages applied to the strong enemy character in the strong step to a next strong step, when the damages applied to the strong enemy character by the time when the predetermined finishing condition is satisfied does not reach the necessary damage to defeat the strong enemy character, and clears the accumulated damages applied to the strong enemy character until then, when the strong enemy character is defeated.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Figure 1:
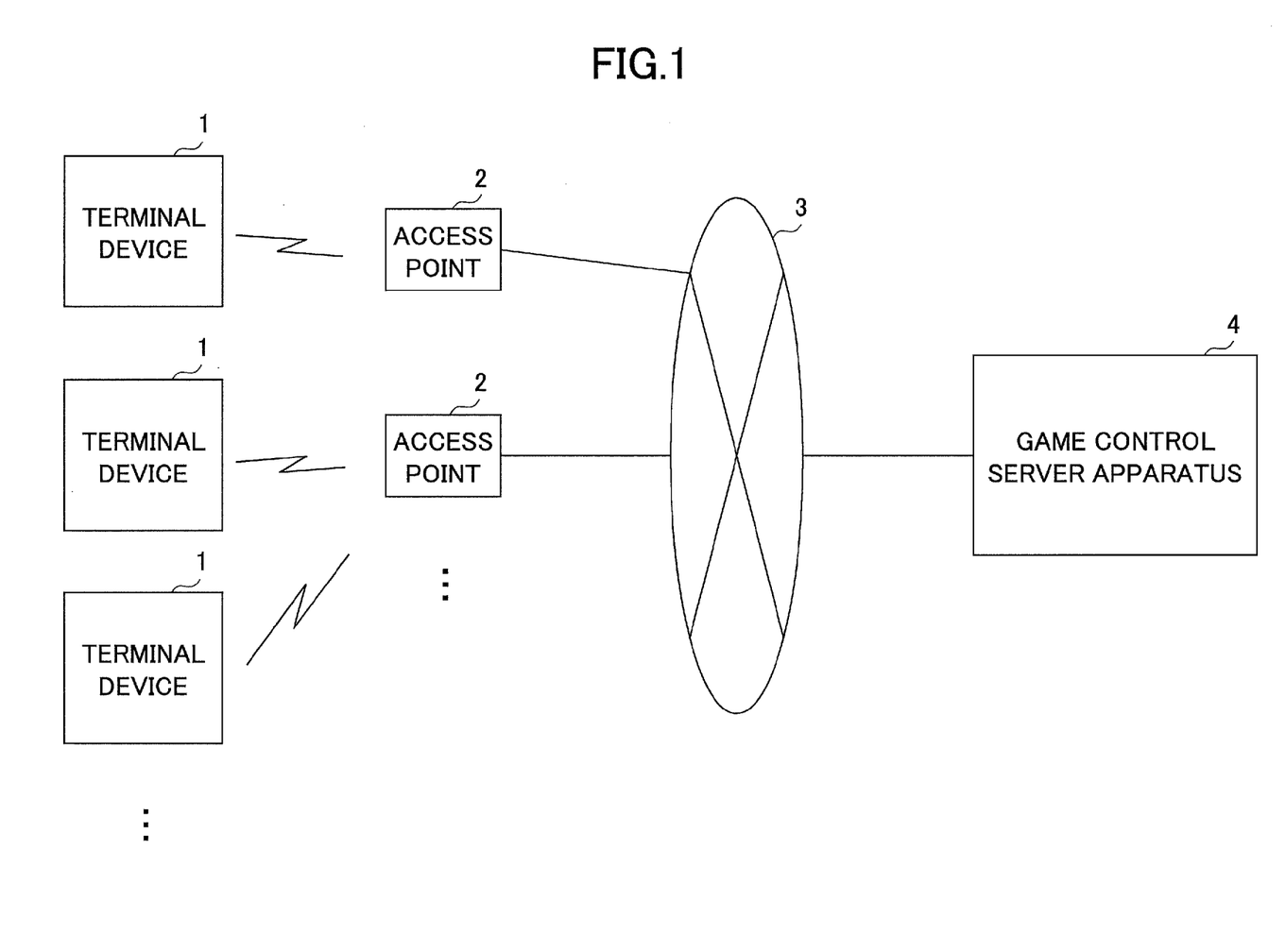
FIG. 1 is a block diagram illustrating an example of a system structure of an embodiment.

FIG. 1 is a block diagram illustrating an example of a system structure of the embodiment.

The system includes a plurality of terminal devices 1 each possessed by a player (user), access points 2 such as a mobile station, a Wi-Fi station or the like, a network 3 such as the INTERNET or the like and a game control server apparatus 4 that manages (controls) a game played by the plurality of players via the network 3. The game control server apparatus 4 is connected to the terminal devices 1 of the plurality of players via the network 3. The terminal device 1 may be a data processing apparatus such as a mobile phone, a smartphone, a game console, a personal computer, a touch pad, a digital book reader or the like.

Figure 2:
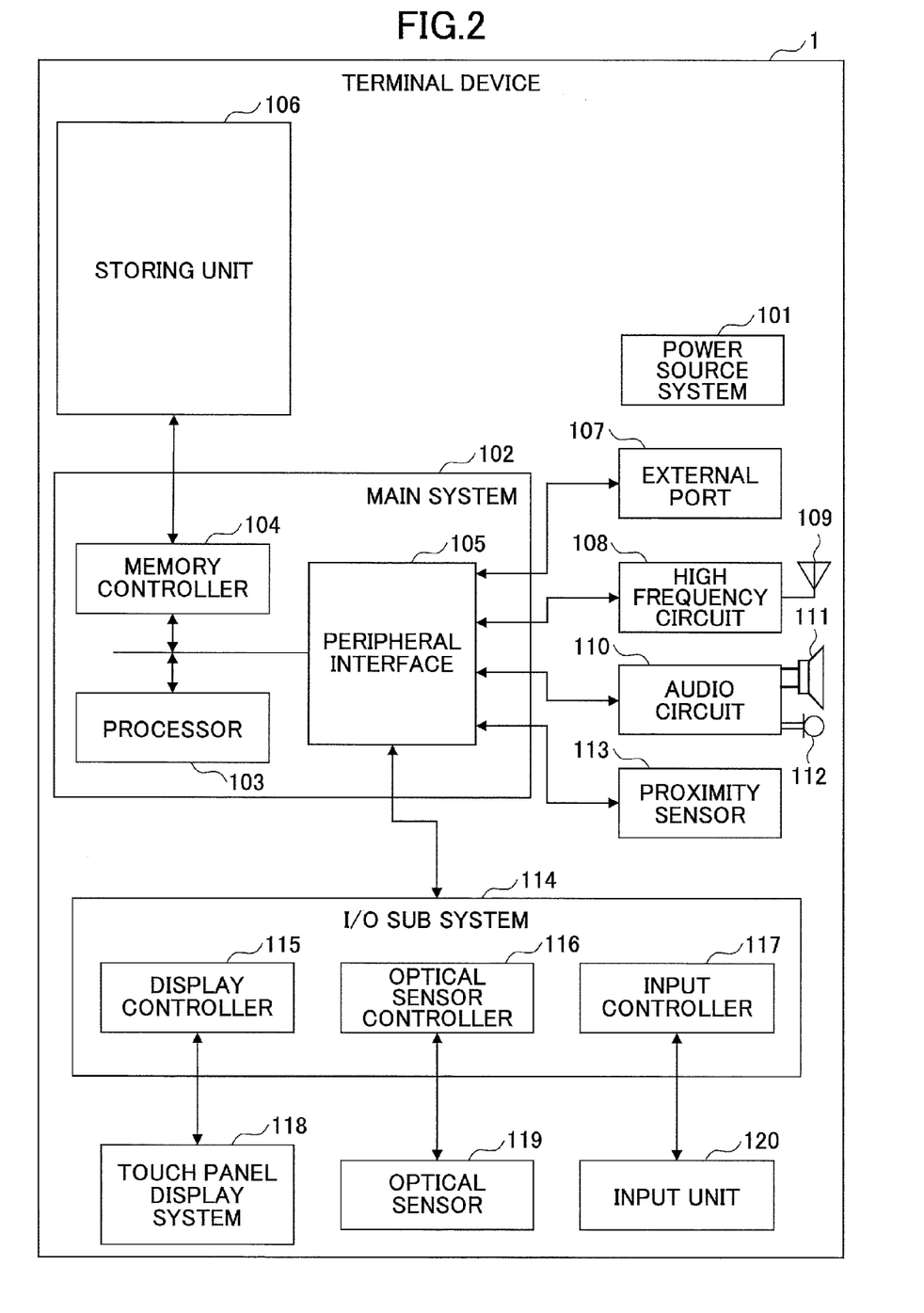
FIG. 2 is a block diagram illustrating an example of a hardware structure of a terminal device of the embodiment.

FIG. 2 is a block diagram illustrating an example of a hardware structure of the terminal device 1 of the embodiment.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O (Input/Output) sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116 and an input controller 117.

Figure 3:
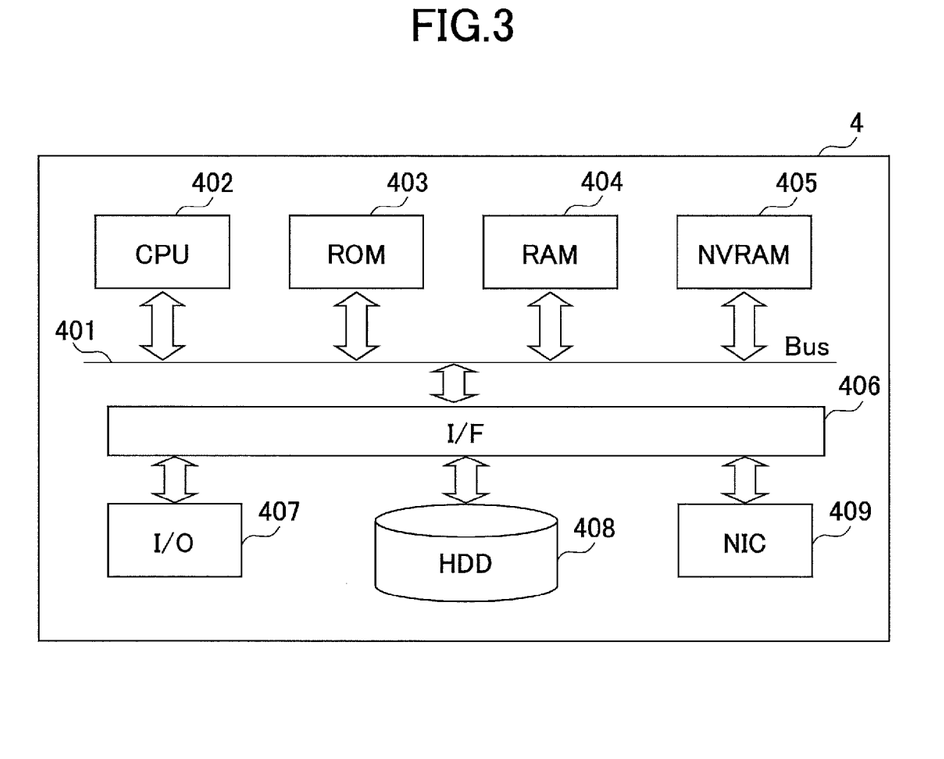
FIG. 3 is a block diagram illustrating an example of a hardware structure of a game control server apparatus of the embodiment.

FIG. 3 is a block diagram illustrating an example of a hardware structure of the game control server apparatus 4 of the embodiment.

The game control server apparatus 4 includes a CPU (Central Processing Unit) 402, a ROM (Read Only Memory) 403, a RAM (Random Access Memory) 404, an NVRAM (Non-Volatile Random Access Memory) 405 and an I/F (Interface) 406 connected to a system bus 401, an I/O (Input/Output Device) 407 for a keyboard, a mouse, a monitor, a CD/DVD (Compact Disk/Digital Versatile Disk) drive or the like, an HDD (Hard Disk Drive) 408 and an NIC (Network Interface Card) 409 connected to the I/F 406 and the like.

Figure 4:
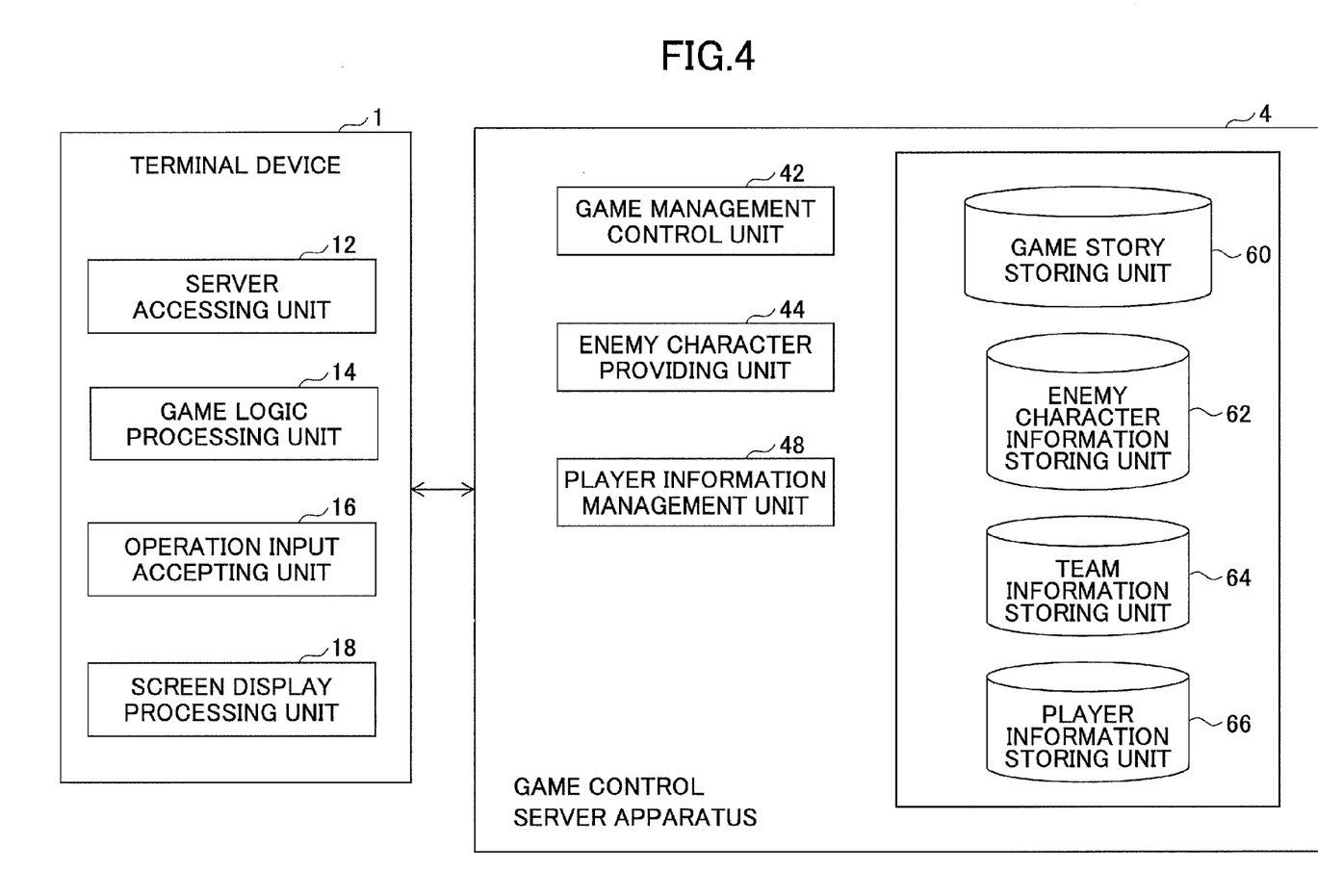
FIG. 4 is a block diagram illustrating an example of functional structures of the terminal device and the game control server apparatus of the embodiment.

FIG. 4 is a block diagram illustrating an example of functional structures of the terminal device 1 and the game control server apparatus 4.

The terminal device 1 includes a server accessing unit 12, a game logic processing unit 14, an operation input accepting unit 16 and a screen display processing unit 18.

The operation input accepting unit 16 accepts an operation input from a player (user) who operates the terminal device 1.

The game logic processing unit 14 processes a game by transitioning screens in accordance with an input operation of the player accepted by the operation input accepting unit 16.

The server accessing unit 12 sends a request to the game control server apparatus 4 and receives a processed result or the like as a response from the game control server apparatus 4 when it is necessary to access the game control server apparatus 4 in a course of the processing by the game logic processing unit 14.

The screen display processing unit 18 displays screens under control of the game logic processing unit 14.

The game control server apparatus 4 includes a game management control unit 42, an enemy character providing unit 44, a player information management unit 48, a game story storing unit 60, an enemy character information storing unit 62, a team information storing unit 64 and a player information storing unit 66.

The game story storing unit 60 stores a game story or the like for performing the game of the embodiment.

The game management control unit 42 controls the entirety of the game control server apparatus 4. The game management control unit 42, based on a request from the terminal device 1, processes a process along with the game story by referring to the game story storing unit 60, and sends a processed result of the request to the terminal device 1 as a response, for example.

In this embodiment, the game is assumed that each of a plurality of players in the same team attacks an enemy character. When the total of the damages applied to the enemy character by the plurality of players becomes a necessary damage to defeat (crush) the enemy character, the enemy character is defeated and a predetermined point is given to each of the plurality of players as a result of defeating the enemy character.

The enemy character providing unit 44 provides a normal enemy character and a strong enemy character in the game, as the enemy characters. Here, a necessary damage to defeat the strong enemy character is greater than a necessary damage to defeat the normal enemy character and an obtainable point when the strong enemy character is defeated is also higher than an obtainable point when the normal enemy character is defeated.

The game management control unit 42 gives a predetermined point to the team and/or each of the players of the team when the normal enemy character or the strong enemy character is defeated by the team. Further, the game management control unit 42 repeats a normal step in which a normal enemy character is provided and appears in the game, a determining step of determining whether an appearance condition of a strong enemy character is satisfied and a strong step in which a strong enemy character is provided and appears in the game when the appearance condition of the strong enemy character is satisfied, within a first period ("one day", for example).

The appearance condition of the strong enemy character is, for example, to defeat predetermined numbers of normal enemy characters. The game management control unit 42 provides a strong enemy character to appear in the game after a plurality of normal enemy characters are defeated. In other words, a strong enemy character, for which a more attractive reward (point) can be obtained, appears in the game for a team if players of the team subsequently defeat a plurality of normal enemy characters by cooperating with each other.

In each of strong steps, the game management control unit 42 finishes the strong step when the strong enemy character is defeated, or a predetermined finishing condition is satisfied. The predetermined finishing condition may be, for example, that a predetermined period (60 minutes, for example) has passed after the strong enemy character appears in the game, or the like. Further, the predetermined finishing condition may be, for example, that each of all of the players of the team attacks the strong enemy character for a predetermined upper limit number of times or the like, which will be explained later.

In this embodiment, in order to increase continuity of the game, the game may be configured such that it is difficult (almost impossible) to defeat a strong enemy character by a single strong step. Thus, in this embodiment, the game management control unit 42 is configured to be capable of accepting less than or equal to a predetermined upper limit number of times of attacking to a strong enemy from each of the players of the team in each of the strong steps. In other words, in this embodiment, each of the players cannot attack the strong enemy character anymore in the strong step after the player attacks the strong enemy character for the limited number of times even within the predetermined period. The limited number of times may be one, for example, or a plurality of times. It is unnecessary for the limited number of times to be constant in the strong steps, and the limited number of times may be increased for later strong steps. Alternatively, a chance time or the like in which the limited number of times is multiplied for plural times may be provided.

Further, in this embodiment, when damages applied to the strong enemy character do not reach a necessary damage to defeat the strong enemy character at the time when the predetermined finishing condition is satisfied, the enemy character providing unit 44 carries over the damages applied to the strong enemy character in the strong step to a next strong step, in each of the strong steps.

On the other hand, when the strong enemy character is defeated, in each of the strong steps, the enemy character providing unit 44 clears the accumulated damages applied to the strong enemy character until then. Further, when the first period has passed, the enemy character providing unit 44 clears the accumulated damages applied to the strong enemy character until then, regardless of the fact that the strong enemy character is defeated or not.

Figure 5:
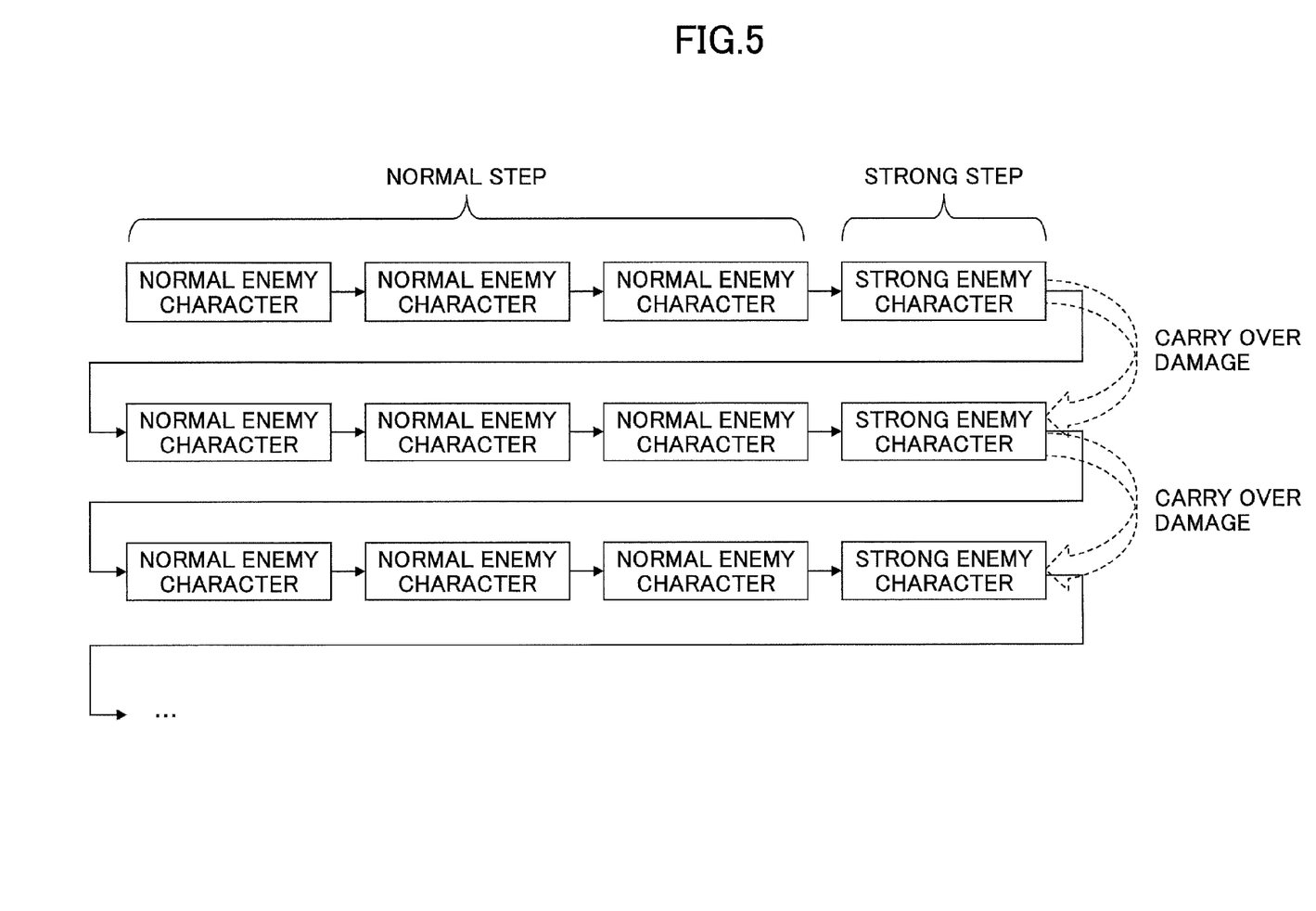
FIG. 5 is a view illustrating an example of an appearance pattern of enemy characters of the embodiment.

FIG. 5 is a view illustrating an example of an appearance pattern of enemy characters of the embodiment.

Here, first, a normal enemy character appears in a normal step, and when the normal enemy character is defeated, a next normal enemy character appears in a next normal step. After three normal enemy characters in total are defeated, a strong enemy character appears in a strong step.

When the strong step is finished, the process goes back to a normal step again. When the strong enemy character is not defeated and the strong step is finished because the predetermined finishing condition is satisfied in the strong step, the damages applied to the strong enemy character until then is carried over to a next strong step. Further, in such a case, the same strong enemy character, that is not defeated yet, may appear in the next strong step.

On the other hand, when the strong enemy character is defeated in the strong step, a new strong enemy character may appear in a next strong step. In such a case, the damage necessary to defeat the new strong enemy character may be larger than that of the previous strong enemy character and also the points obtainable when the new strong enemy character is defeated may be greater than that for the previous strong enemy character.

Here, for the example illustrated in FIG. 5, although it is assumed that a strong enemy character appears every time three normal enemy characters are defeated, the number of normal enemy characters to defeat necessary for a strong enemy character to appear may be randomly determined, may become larger for later strong steps, or the like.

In this embodiment, with the above configuration, it is difficult to defeat a strong enemy character by a single strong step, and meanwhile, the damage applied to the strong enemy character in the previous strong step is carried over to a next strong step. Thus, the motivation of the player to continuously apply damages to the strong enemy character by a plurality of the strong steps is increased, and it is possible to make the player continue the game.

Referring back to FIG. 4, further, in accordance with points obtained by each of the teams within the first period, the game management control unit 42 gives larger rewards to a team that obtained more points among the plurality of teams. In other words, the teams compete with each other by points obtained by applying damages to the enemy characters within the first period to scramble rewards. The rewards may be points, items usable in the game or the like. Even when the obtained points for the team is less than that of other team, the team may be given a certain reward if the strong enemy character is defeated by the team. On the other hand, if no strong enemy character is defeated by a team within the first period, the reward may not be given to the team.

Further, this game may be performed for a plurality of times within a second period (one-week, for example), that is longer than the first period (one-day, for example). Further, every time the first period passes, for a next first period, the enemy character providing unit 44 may provide strong enemy characters for each of which a damage necessary to defeat becomes larger than that for the strong enemy characters of the previous first period.

The player information storing unit 66 stores various player information of all of the players who participate in the game. In this embodiment, the player information storing unit 66 stores information of characters possessed by the player in corresponded with the player, for each of the plurality of players. The player information management unit 48 manages updating, referring or the like of the player information stored in the player information storing unit 66.

Figure 6:
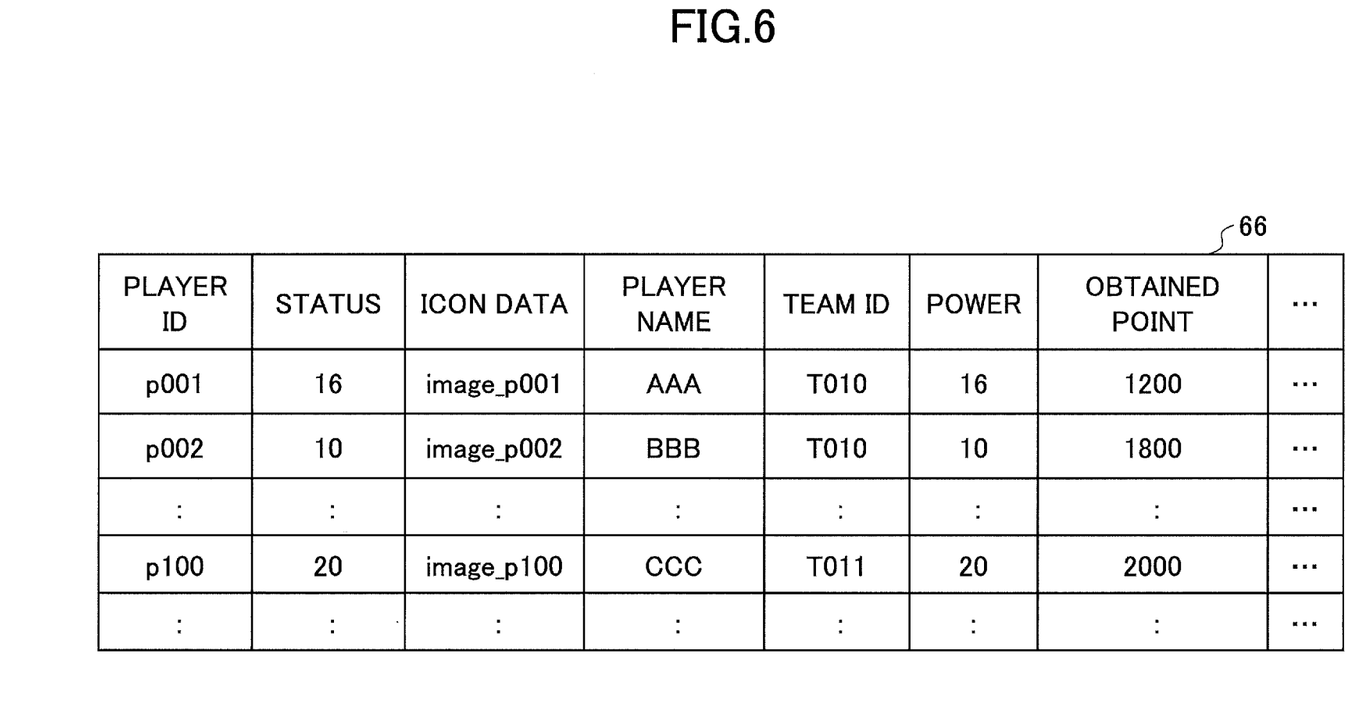
FIG. 6 is a view illustrating an example of an internal structure of a player information storing unit of the embodiment.

FIG. 6 is a view illustrating an example of an internal structure of the player information storing unit 66 of the embodiment.

The player information storing unit 66 includes items (fields) such as "player ID", "status", "icon data", "player name", "team ID", "power", "obtained point" or the like.

The "player ID" is data to specify the player. The "status" indicates the status of the player in a progression of the game. The "icon data" is data to specify a display icon of the player. The "player name" is data for display name of the player.

The "team ID" is data to specify the team to which the player belongs. The "power" is data indicating a power that is applied to an enemy character when the player applies a damage to the enemy character. The power may correspond to the level of the player, and the power may become higher as the level of the player becomes higher, for example. The "obtained point" is data indicating points that are obtained by the player in the game.

Referring back to FIG. 4, the enemy character information storing unit 62 stores various character information of all of the enemy characters that appear in the game. The game management control unit 42 also manages updating, referring or the like of the character information stored in the enemy character information storing unit 62.

Figure 7:
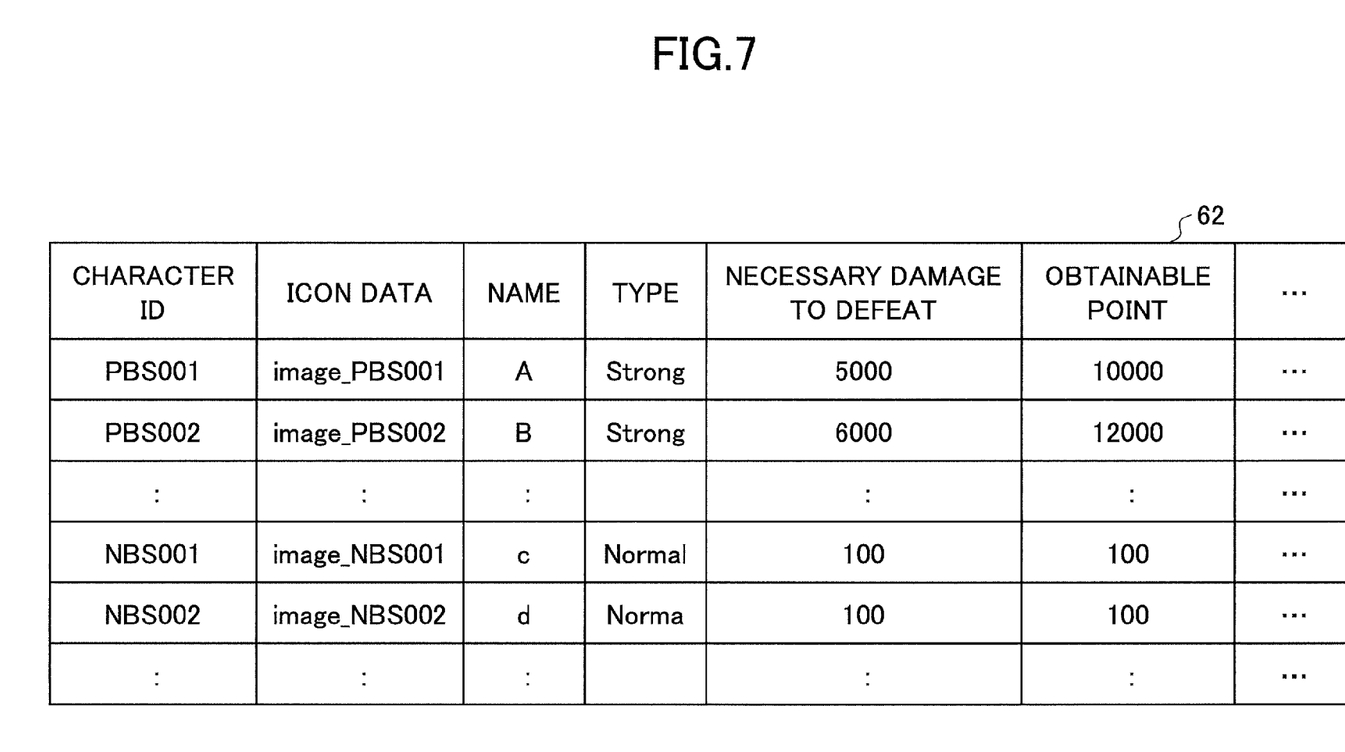
FIG. 7 is a view illustrating an example of an internal structure of an enemy character information storing unit of the embodiment.

FIG. 7 is a view illustrating an example of an internal structure of the enemy character information storing unit 62 of the embodiment.

The enemy character information storing unit 62 includes items (fields) such as "character ID", "icon data", "name", "type", "necessary damage to defeat", "obtainable point", or the like.

The "character ID" is data to specify the enemy character. The "icon data" is data to specify a display icon of the enemy character. The "name" is data for display name of the enemy character. The "type" is data indicating whether the enemy character is a normal enemy character or a strong enemy character. The "obtainable point" is data indicating points that are given to the team when the enemy character is defeated. Here, although not illustrated in FIG. 7, the enemy character information storing unit 62 may store data indicating points that are given to each of the players of the team when the enemy character is defeated.

For example, for a character with character ID "PBS001", the type of the character is a strong enemy character (Strong), the damage necessary to defeat is "5000" and the points given to the team when the character is defeated is "10000". Similarly, for a character with character ID "NBS001", the type of the character is a normal enemy character (Normal), the damage necessary to defeat is "100", and the points given to the team when the character is defeated is "100". As such, for the strong enemy character, the damage necessary to defeat is larger than that of the normal enemy character, but meanwhile, the points given to the team is also very larger than that of the normal enemy character.

As an example, when a player attacks an enemy character, it is assumed that a damage corresponding to a power of the player is applied to the enemy character. For example, in the example illustrated in FIG. 6 and FIG. 7, when a player with player ID "p001" attacks the strong enemy character with the character ID "PBS001", the damage "16" is applied to the strong enemy character.

In this embodiment, the predetermined upper limit number of times may be determined such that it is difficult (or impossible) to defeat the strong enemy character by a single strong step even when each of all of the players of the team attacks the strong enemy character for the predetermined upper limit number of times, based on the damage capable of applying to the strong enemy character by a single attack and a damage necessary to defeat the strong enemy character. Here, the predetermined upper limit number of times is a possible number of times of attacking the strong enemy character for each of the players of the team in each of the strong steps.

For example, it is assumed that the team includes 20 players, the maximum damage for each of the players to apply to the strong enemy character by a single attack is "50", and the damage necessary to defeat the strong enemy character is "5000". In such a case, if the predetermined upper limit number of times is set as "once", the maximum damage capable of applying the strong enemy character in a single strong step becomes 50×20×1=1000. Thus, as the damage necessary to defeat the strong enemy character is "5000", it is difficult (or impossible) to defeat the strong enemy character by the strong step. Similarly, even when it is assumed that the predetermined upper limit number of times is "twice", the maximum damage capable of being applied to the strong enemy character in a single strong step becomes 50×20×2=2000. Thus, as the damage necessary to defeat the strong enemy character is "5000", it is difficult (or impossible) to defeat the strong enemy character by the strong step. On the other hand, when it is assumed that the predetermined upper limit number of times is "5 times", the maximum damage capable of being applied to the strong enemy character in a single strong step becomes 50×20×5=5000. In such a case, it is possible to defeat the strong enemy character by the strong step. Thus, under the above described assumption, the predetermined upper limit number of times may be set less than or equal to "4 times" or the like.

Referring back to FIG. 4, the team information storing unit 64 stores various team information of all of the teams that are formed in the game. The game management control unit 42 also manages updating, referring or the like of the team information stored in the team information storing unit 64.

Figure 8:
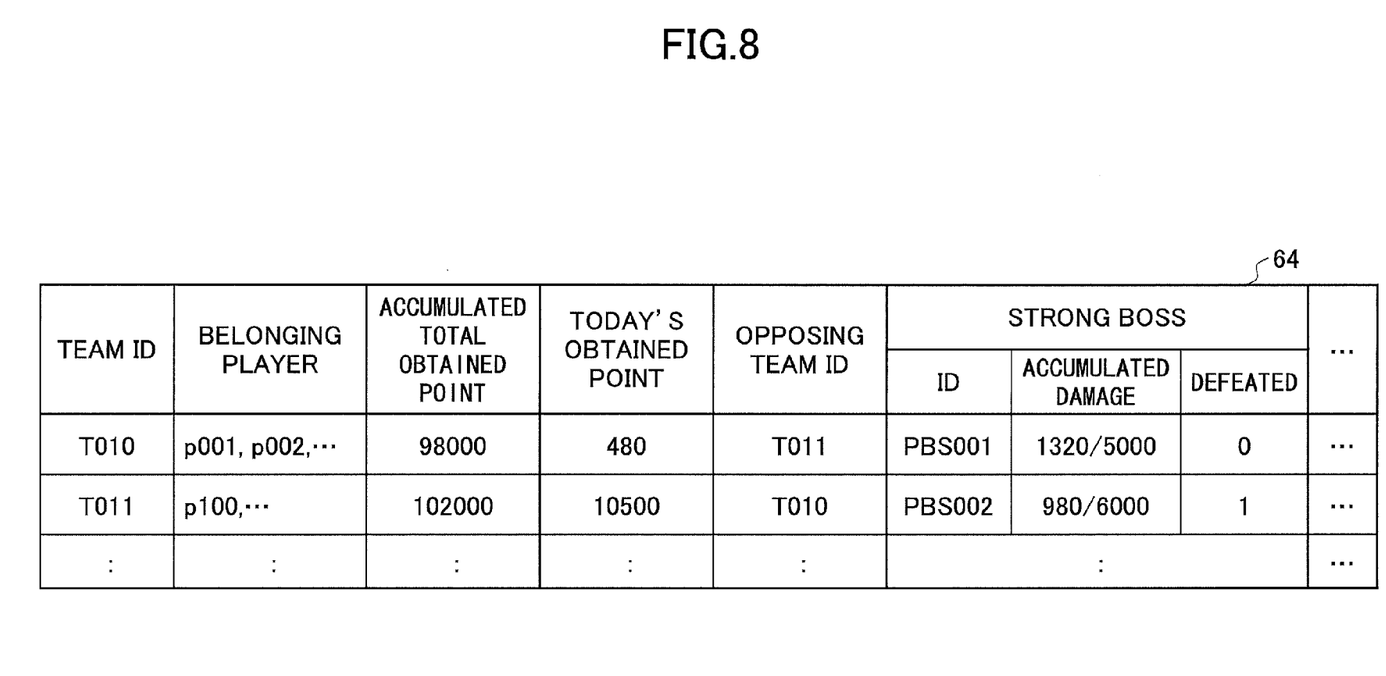
FIG. 8 is a view illustrating an example of an internal structure of a team information storing unit of the embodiment.

FIG. 8 is a view illustrating an example of an internal structure of the team information storing unit 64 of the embodiment.

The team information storing unit 64 includes items (fields) such as "team ID", "belonging player ID", "accumulated total obtained point", "today's obtained point", "opposing team ID", "strong enemy character", or the like.

The "team ID" is data to specify the team. The "belonging player ID" is data to specify players who belong to the team. The "accumulated total obtained point" is data indicating accumulated total points obtained by the team. The "today's obtained point" is data indicating points obtained by the team during the first period ("one day" in this example).

The "strong enemy character" includes items (fields) such as "ID", "accumulated damage", "defeated", or the like. The "ID" is data to specify the strong enemy character. The "accumulated damage" is data obtained by accumulating the damages applied to the strong enemy character in each of the strong steps. As described above, when the strong step is finished because the finishing condition is satisfied before the strong enemy character is defeated, the damages applied to the strong enemy character in that strong step is accumulated in the "accumulated damage". The "defeated" is data indicating whether the strong enemy character is defeated or not in the current first period.

For example, for a team with team ID "T010", players with player IDs "p001", "p002" ... and the like belong thereto, and a team with team ID "T011" is an opponent. Further, the team with team ID "T010" is now attacking the strong enemy character with the character ID "PBS001" and the accumulated damage applied to the strong enemy character is 1320 with respect to the necessary damage to defeat the strong enemy character of 5000. Further, the team does not defeat a strong enemy character in the current first period.

Figure 9:
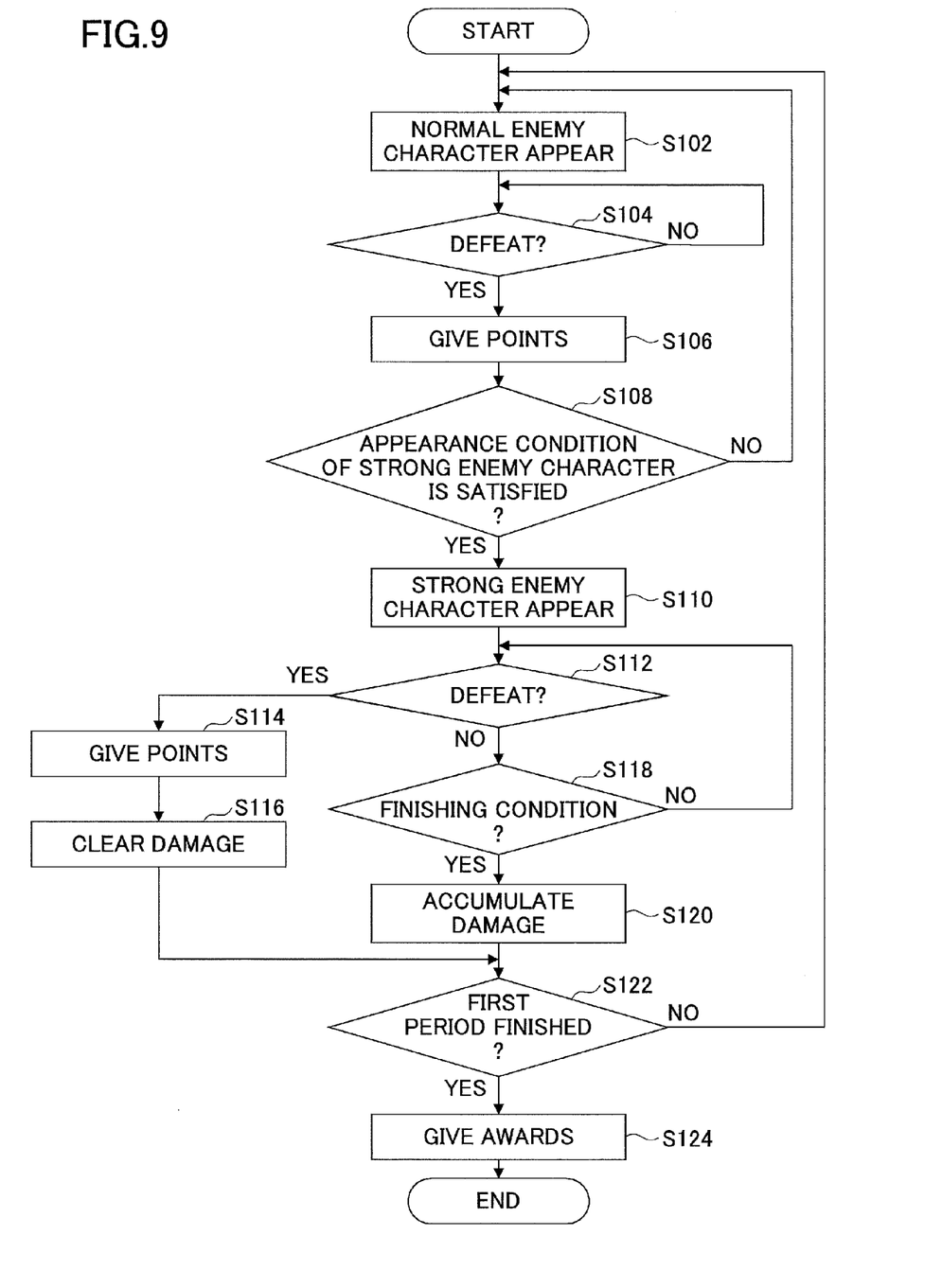
FIG. 9 is a flowchart illustrating an example of processing steps of the game control server apparatus of the embodiment.

FIG. 9 is a flowchart illustrating an example of process steps of the game control server apparatus 4 of the embodiment.

First, under control of the game management control unit 42, the enemy character providing unit 44 provides a normal enemy character to appear in the game for each of the players of a team (step S102). When the normal enemy character is defeated (YES in step S104), the game management control unit 42 gives points for defeating the normal enemy character to the team and the players of the team (step S106). Here, for the normal enemy character as well, if the normal enemy character is not defeated within a predetermined period, a next normal enemy character may be provided to appear in the game.

Subsequently, the game management control unit 42 determines whether an appearance condition of a strong enemy character is satisfied (step S108). Then, when the appearance condition of the strong enemy character is satisfied (YES in step S108), the game management control unit 42 controls the enemy character providing unit 44 to provide the strong enemy character to appear in the game (step S110). At this time, the game management control unit 42 determines whether an accumulated damage is stored by referring to the "accumulated damage" of the "strong enemy character" of the team information storing unit 64. Then, when the accumulated damage is stored, the game management control unit 42 notifies it to the enemy character providing unit 44. The enemy character providing unit 44 provides the strong enemy character to appear in the game under a condition that the accumulated damage is carried over.

When the strong enemy character is defeated (YES in step S112), the game management control unit 42 finishes the strong step, and gives points for defeating the strong enemy character to the team and the players of the team (step S114). Thereafter, the game management control unit 42 clears (deletes) the "accumulated damage" of the "strong enemy character" of the team information storing unit 64 (step S116). Further, at this time, the game management control unit 42 adds a flag or the like indicating that the strong enemy character is defeated in the "defeated" of the "strong enemy character" of the team information storing unit 64.

On the other hand, in step S112, when the strong enemy character is not defeated (NO in step S112), the game management control unit 42 determines whether the finishing condition of the strong step is satisfied (step S118). When the finishing condition is not satisfied, the process returns back to step S112 and the same steps are repeated. On the other hand, when the finishing condition is satisfied in step S118 (YES in step S112), the game management control unit 42 finishes the strong step. Then, the game management control unit 42 accumulates the damages applied to the strong enemy character in this strong step to the "accumulated damage" of the "strong enemy character" of the team information storing unit 64 (step S120).

Thereafter, when the first period is not finished (NO in step S122), the process returns back to step S102 and the same steps are repeated. On the other hand, when the first period is finished (YES in step S122), the game management control unit 42 compares the obtained points of this team and the opposing team within the first period, and give a larger rewards to the team who obtains more points in accordance with the obtained points of the teams.

Although not illustrated in the drawings, the game management control unit 42 always monitors the end of the first period, ends the process of providing the enemy character in the game when the first period ends, and performs the process of step S124 at that time.

According to the embodiment, a technique capable of increasing continuity of a game in which enemy characters sequentially appear and having a player continue the game can be provided.

The individual constituents of the terminal device 1 and the game control server apparatus 4 illustrated in FIG. 4 indicate not a structure of hardware units but blocks of functional units. The individual constituents of the terminal device 1 and the game control server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications. Further, the functions performed by the game control server apparatus 4 are not necessarily performed in a single apparatus and may be dispersed in a plurality of apparatuses.

Although a preferred embodiment of the game control server apparatus has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

Further, the game may be performed by any of a "browser type" and an "application type". In the browser type, screen transition data (View data) that describes a display control content of a series of screens in accordance with the game progression is managed at the game control server apparatus 4 side, data such as an HTML data document, images corresponded to the HTML data document or the like are sent to the terminal device in response to a request of obtaining data by an input operation from the terminal device 1, and the data are displayed in the web browser on the terminal device 1. Meanwhile, in the application type, game application software (application program) is previously downloaded to the terminal device 1 from the game control server apparatus 4 or the like, the game application software is executed on the terminal device 1, and screen data is generated to be displayed based on screen transition data included in the game application software that is stored in the terminal device 1 after being downloaded and data obtained from the server by an input operation as a trigger.

What is claimed is:

1. A game control server apparatus connected to a plurality of terminal devices of a plurality of players via a network, the game control server apparatus comprising:
   an enemy character providing unit that provides a normal enemy character and a strong enemy character in a game,
   the game being configured that each of a plurality of players of a same team attacks an enemy character, and points are given to the team for defeating the enemy character when the total of damages applied to the enemy character by the plurality of players becomes a necessary damage to defeat the enemy character,
   the necessary damage to defeat the strong enemy character being larger than the necessary damage to defeat the normal enemy character and the points given to the team when the strong enemy character is defeated being greater than the points given to the team when the normal enemy character is defeated; and
   a game management control unit that repeats, for a first period,
      performing a normal step of providing the normal enemy character to appear in the game,
      every time the normal step is finished, performing a determining step of determining whether an appearance condition of the strong enemy character is satisfied,
      when the appearance condition is satisfied in the determining step, performing a strong step of providing the strong enemy character; and
      every time the strong step is finished, or when the appearance condition is not satisfied in the determining step, returning back to the performing the normal step,
   wherein in each of the strong steps,
      the game management control unit
         is capable of accepting predetermined upper limit number of times of attacking from each of the plurality of players, the predetermined upper limit number of times being set as a number by which it is difficult to defeat the strong enemy character by a single strong step even when each of all of the plurality of players attack the strong enemy character for the predetermined upper limit number of times, and
         finishes the strong step when a predetermined finishing condition is satisfied or when the strong enemy character is defeated, the predetermined finishing condition being that accepting the predetermined upper limit number of times of attacking from each of all of the plurality of players or a predetermined period passes after the strong enemy character appears, and
      the enemy character providing unit
         clears the accumulated damages applied to the strong enemy character until then, when the strong step is ended because the strong enemy character is defeated, and accumulates the damages applied to the strong enemy character in the strong step so that the accumulated damages are carried over for the strong enemy in a next strong step and the strong enemy character is provided in the next strong step under a condition that the strong enemy character is already damaged by the accumulated damages, when the strong step is ended because the predetermined condition is satisfied but the strong enemy character is not defeated because the damages applied to the strong enemy character by the time when the predetermined finishing condition is satisfied does not reach the necessary damage to defeat the strong enemy character.

2. The game control server apparatus according to claim 1, wherein the appearance condition of the strong step is that a predetermined number of normal enemy character is defeated.

3. The game control server apparatus according to claim 1, wherein the game management control unit gives larger rewards to a team among a plurality of teams that obtained more points within the first period in accordance with points obtained by each of the teams.

4. The game control server apparatus according to claim 1, wherein the game is performed for a plurality of times for a second period that is longer than the first period, and
wherein when the first period passes, the enemy character providing unit clears the accumulated damages applied to the strong enemy character until then regardless of whether the strong enemy character is defeated.

5. The game control server apparatus according to claim 4, wherein every time the first period passes, the enemy character providing unit provides a strong enemy character for which a damage necessary to defeat becomes larger than that for the strong enemy character of the previous first period in a next first period.

6. A non-transitory computer-readable recording medium having recorded thereon a program for a game control apparatus connected to a plurality of terminal devices of a plurality of players via a network, to execute functions comprising:
an enemy character providing function that provides a normal enemy character and a strong enemy character in a game,
the game being configured that each of a plurality of players of a same team attacks an enemy character, and points are given to the team for defeating the enemy character when the total of damages applied to the enemy character by the plurality of players becomes a necessary damage to defeat the enemy character,
the necessary damage to defeat the strong enemy character being larger than the necessary damage to defeat the normal enemy character and the points given to the team when the strong enemy character is defeated being greater than the points given to the team when the normal enemy character is defeated; and
a game management control function that repeats, for a first period,
performing a normal step of providing the normal enemy character to appear in the game,
every time the normal step is finished, performing a determining step of determining whether an appearance condition of the strong enemy character is satisfied,
when the appearance condition is satisfied in the determining step, performing a strong step of providing the strong enemy character; and
every time the strong step is finished, or when the appearance condition is not satisfied in the determining step, returning back to the performing the normal step,
wherein in each of the strong steps,
the game management control function
is capable of accepting predetermined upper limit number of times of attacking from each of the plurality of players, the predetermined upper limit number of times being set as a number by which it is difficult to defeat the strong enemy character by a single strong step even when each of all of the plurality of players attack the strong enemy character for the predetermined upper limit number of times, and
finishes the strong step when a predetermined finishing condition is satisfied or when the strong enemy character is defeated, the predetermined finishing condition being that accepting the predetermined upper limit number of times of attacking from each of all of the plurality of players or a predetermined period passes after the strong enemy character appears, and
the enemy character providing function
clears the accumulated damages applied to the strong enemy character until then, when the strong step is ended because the strong enemy character is defeated, and
accumulates the damages applied to the strong enemy character in the strong step so that the accumulated damages are carried over for the strong enemy in a next strong step and the strong enemy character is provided in the next strong step under a condition that the strong enemy character is already damaged by the accumulated damages, when the strong step is ended because the predetermined condition is satisfied but the strong enemy character is not defeated because the damages applied to the strong enemy character by the time when the predetermined finishing condition is satisfied does not reach the necessary damage to defeat the strong enemy character.

\* \* \* \* \*